R. S. KELLOGG.
STIRRING DEVICE.
APPLICATION FILED MAR. 28, 1914.
1,160,413.
Patented Nov. 16, 1915.
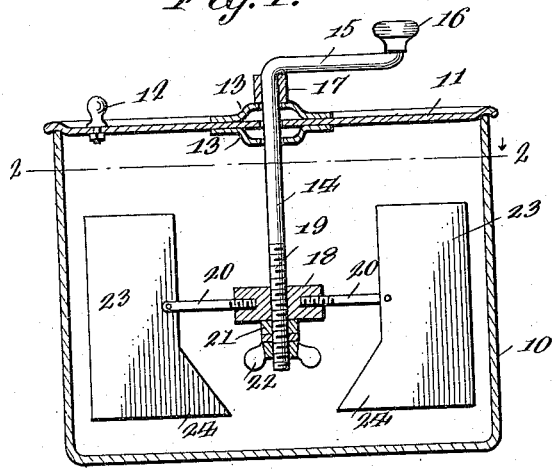
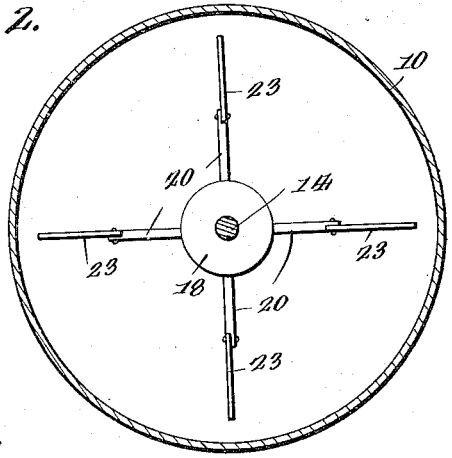
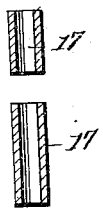
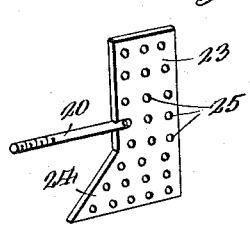
Inventor
Ray S. Kellogg.
Witnesses

UNITED STATES PATENT OFFICE.

RAY S. KELLOGG, OF NORWALK, OHIO.

STIRRING DEVICE.

1,160,413.  Specification of Letters Patent.  Patented Nov. 16, 1915.

Application filed March 28, 1914. Serial No. 828,058.

*To all whom it may concern:*

Be it known that I, RAY S. KELLOGG, a citizen of the United States, residing at Norwalk, in the county of Huron and State of Ohio, have invented certain new and useful Improvements in Stirring Devices, of which the following is a specification.

This invention relates to a stirring device, and the principal object of the invention is to provide a stirring device which is intended to be removably connected with the lid of a cooking vessel and which is so constructed that its various parts may be dismounted and the device removed from the lid of the cooking vessel.

Another object of the invention is to so construct the stirring device that the depth to which it will extend into the cooking vessel may be regulated and thus the stirring device used with cooking vessels of various depths.

Another object of the invention is to provide an improved type of stirring blade.

This invention is illustrated in the accompanying drawings wherein—

Figure 1 is a view showing a cooking vessel in vertical section and the stirring device mounted therein and shown principally in elevation, certain portions of the stirring device being shown in section to show the manner of constructing the same; Fig. 2 is a transverse sectional view taken along the line 2—2 of Fig. 1; Fig. 3 is a view showing in section sleeves which may be substituted for a sleeve shown in Fig. 1; Fig. 4 is a perspective view of a slightly modified form of stirring blade.

The cooking utensil 10 is provided with the usual cover 11 which is provided with a removable knob 12 and which is provided with a central opening through which the shaft of the stirring device may pass. Disks 13 are secured above and below the opening in the center of the cover 11 and form guiding bearings for the shaft of the stirring device so that the shaft may not have excess side play in the opening of the cover.

The stirring device has its shaft 14 extending through the cover 11 and bearing disk 13 and has its upper end portion bent to form a crank handle 15 to the end of which there is secured a knob 16 so that the shaft 14 may be easily rotated. A bearing sleeve 17 is mounted upon the shaft 14 between the crank 15 and upper bearing disk 13 and holds the shaft 14 in the desired vertical adjustment so that the shaft will extend into the cooking utensil 10 the desired extent. If it is desired to raise the shaft 14 to a higher point than shown in Fig. 1, one of the sleeves 17 shown in Fig. 3 may be substituted for the one shown in Fig. 1, thus lifting the shaft 14. A collar 18 is threaded upon the lower threaded end portion 19 of the shaft 14 and is provided with sockets in its edge so that the stems 20 may be connected with the collar 18. Securing nuts or washers 21 are placed upon the shaft 14 beneath the collar 18, and a winged locking nut 22 is placed upon the shaft beneath the nuts or washers 21 so that the collar 18 will be removably but securely held in place. To the ends of the arms 20 there is secured the blades 23 which extend vertically in the cooking vessel 10 and are provided at their lower ends with inwardly extending projections or points 24 which extend toward the center of the cooking utensil and thus permit the material in the central portion of the utensil to be stirred. It is of course obvious that the blades 23 may be brought as close to the bottom of the cooking utensil as desired by suitable adjustment of the collar 18. In Fig. 1 the stirring blades 23 are of unperforated strips of material, but it is obvious that if desired, the blades may be provided with the openings or perforations 25 shown in Fig. 4 so that material in the utensil may pass through the blades when the blades are in motion and thus permit the stirring blades to be operated very easily. When it is desired to remove the stirring device from the cover for cleaning purposes or for transferring the same to a second utensil, it is simply necessary to remove the winged nut 22 and washers or nuts 21 and then remove the collar 18. The shaft 14 could then be easily withdrawn from the cover 11 and after the stirring device has been cleaned, could be replaced in the same utensil or a second utensil. If the second utensil is of less or greater height than one previously used, the proper sleeve 17 would be substituted for the one previously used. It will thus be seen that a very efficient but at the same time, a very simple device has been provided.

What is claimed is:

A stirring device comprising a vessel, a cover for said vessel and provided with a central opening, bearing disks carried by said cover above and below the opening formed therein, a shaft extending through said cover and bearing disks and having its upper end portion bent to form a crank handle, a sleeve mounted upon said shaft between said crank handle and upper bearing disk to regulate the extent of said shaft extending into said vessel, a collar removably mounted upon the lower end portion of said shaft, arms extending from said collar in radiating relation, and blades secured to the outer end portion of said arms and extending vertically in said receptacle and having their lower end portions provided with extensions extending toward the center of said vessel.

In testimony whereof I affix my signature in presence of two witnesses.

RAY S. KELLOGG.

Witnesses:
MARIE ROMER,
J. R. KNAPP.

Copies of this patent may be obtained for five cents each, by addressing the "Commissioner of Patents, Washington, D. C."